US012452927B2

(12) United States Patent
Frederiksen et al.

(10) Patent No.: US 12,452,927 B2
(45) Date of Patent: Oct. 21, 2025

(54) SELECTION OF RANDOM ACCESS MODE

(71) Applicant: NOKIA TECHNOLOGIES OY, Espoo (FI)

(72) Inventors: Frank Frederiksen, Klarup (DK); Claudio Rosa, Randers (DK); Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 619 days.

(21) Appl. No.: 17/285,424

(22) PCT Filed: Nov. 1, 2018

(86) PCT No.: PCT/CN2018/113543
§ 371 (c)(1),
(2) Date: Apr. 14, 2021

(87) PCT Pub. No.: WO2020/087479
PCT Pub. Date: May 7, 2020

(65) Prior Publication Data
US 2021/0345412 A1  Nov. 4, 2021

(51) Int. Cl.
*H04W 74/0833* (2024.01)
*H04W 52/00* (2009.01)
(52) U.S. Cl.
CPC ............... *H04W 74/0833* (2013.01)
(58) Field of Classification Search
CPC ............ H04W 74/0833; H04W 56/00; H04W 56/0015; H04W 74/08; H04W 24/08;
(Continued)

(56) References Cited

U.S. PATENT DOCUMENTS

2010/0097985 A1  4/2010 Orlik et al.
2018/0041410 A1* 2/2018 Yi ................. H04W 28/0278
(Continued)

FOREIGN PATENT DOCUMENTS

CN  101730256 A  6/2010
CN  102215598 A  10/2011
(Continued)

OTHER PUBLICATIONS

First Examination Report dated Feb. 28, 2022 corresponding to Indian Patent Application No. 202147023877.
(Continued)

*Primary Examiner* — Mohamed A Kamara
(74) *Attorney, Agent, or Firm* — SQUIRE PATTON BOGGS (US) LLP

(57) ABSTRACT

Embodiments of the present disclosure relate to selecting random access (RA) mode. In example embodiments. The method comprises obtaining an impact factor associated with RA of a terminal device to a network device, the impact factor indicating at least one of the following: a synchronization status between the terminal device and the network device, a status of a channel between the terminal device and the network device for performing RA, a capability of the terminal device for supporting early data transmission (EDT), a predefined access category of the terminal device, or a RA mode-related indication received from the network device; selecting a RA mode at least in part based on obtained impact factor; and performing RA to the network device with the selected RA mode. In this way, the terminal device may select different RA mode according to different scenario.

21 Claims, 2 Drawing Sheets

(58) Field of Classification Search
CPC ..... H04W 72/08; H04W 72/085; H04W 4/70; H04L 5/0048; H04B 17/09; H04B 17/318
See application file for complete search history.

(56) References Cited

U.S. PATENT DOCUMENTS

| | | | |
|---|---|---|---|
| 2018/0205516 A1* | 7/2018 | Jung | H04W 74/0836 |
| 2018/0220452 A1* | 8/2018 | Sivanesan | H04W 74/0841 |
| 2019/0053271 A1* | 2/2019 | Islam | H04W 74/0833 |
| 2019/0327770 A1* | 10/2019 | Liu | H04W 36/305 |
| 2020/0053799 A1* | 2/2020 | Jeon | H04L 5/0048 |
| 2021/0045083 A1* | 2/2021 | Liu | H04W 64/00 |
| 2021/0385869 A1* | 12/2021 | Hong | H04W 74/0836 |

FOREIGN PATENT DOCUMENTS

| | | |
|---|---|---|
| CN | 104883746 A | 9/2015 |
| CN | 104919885 A | 9/2015 |
| CN | 107432035 A | 12/2017 |
| CN | 107734672 A | 2/2018 |
| JP | 2013513321 A | 4/2013 |
| JP | 2014502120 A | 1/2014 |
| WO | 2011/120352 A1 | 10/2011 |
| WO | 2018/064367 A1 | 4/2018 |
| WO | 2018139575 A1 | 8/2018 |
| WO | 2018147280 A1 | 8/2018 |

OTHER PUBLICATIONS

Office Action dated Apr. 18, 2023, corresponding to Indonesian Patent Application No. P00202103364.
Decision of Final Rejection dated Dec. 23, 2022, corresponding to Japanese Patent Application No. 2021-523631.
Extended European Search Report dated May 23, 2022 corresponding to European Patent Application No. 18938407.6.
Media Tek Inc., "2-step CBRA procedure," R2-1812342, 3GPP TSG-RAN WG2 Meeting #103, Gothenburg, Sweden, Aug. 20-24, 2018, Aug. 9, 2018, XP051521949.
Samsung, "Discussion on early data transmission for NB-IoT," R1-1801931, 3GPP TSG RAN WG1 Meeting #92, Athens, Greece, Feb. 26-Mar. 2, 2018, Feb. 16, 2018, XP051397077.
Office Action and Search Report dated Jul. 10, 2023, corresponding to Chinese Patent Application No. 201880099229.1.
International Search Report and Written Opinion dated Apr. 1, 2019 corresponding to International Patent Application No. PCT/CN2018/113543.
Office Action dated Jun. 21, 2022, corresponding to Japanese Application No. 2021-523631.
Chinese Office Action issued in corresponding Chinese Patent Application No. 20188099229.1 on Dec. 28, 2023.
Chinese Office Action issued in corresponding Chinese Patent Application No. 201880099229.1 on May 11, 2024.
Communication pursuant to Article 94(3) EPC dated Dec. 16, 2024 corresponding to European Patent Application No. 18938407.6.
Office Action dated Jul. 2, 2025 corresponding to Vietnamese Patent Application No. 1-2021-02342, with English translation thereof.
Notice of the Result of Substantive Examination Pursuant to Article 62(3) of Indonesian Patent Law No. 13/2016 dated Aug. 21, 2025 corresponding to Indonesian Patent Application No. P00202103364, with English translation thereof.

* cited by examiner

SELECTION OF RANDOM ACCESS MODE

FIELD

Embodiments of the present disclosure generally relate to the field of telecommunication and, in particular, to selection of random access (RA) mode.

BACKGROUND

Wireless telecommunication networks may include one or more user equipments (UEs) and one or more base stations (BSs). Before the UE can establish a connection with the base station, the UE usually performs one or more procedures to notify the BS that the UE is within communication range and ready for the network to assign wireless resources to the UE. An example of such a procedure may include a RA procedure.

There are several different RA modes for performing RA. In some scenarios, multiple RA modes can be supported simultaneously and available in a cell. Different RA modes have different requirement for uplink resources and can bring different latency.

SUMMARY

In general, example embodiments of the present disclosure provide a solution for selecting RA mode.

In a first aspect, there is provided a method for communication. The method comprises obtaining an impact factor associated with random access (RA) of a terminal device to a network device, the impact factor indicating at least one of the following: a synchronization status between the terminal device and the network device, a status of a channel between the terminal device and the network device for performing RA, a capability of the terminal device for supporting early data transmission (EDT), a predefined access category of the terminal device, or a RA mode-related indication received from the network device; selecting a RA mode at least in part based on obtained impact factor; and performing RA to the network device with the selected RA mode.

In a second aspect, there is provided an electronic device. The electronic device comprises at least one processor; and at least one memory including computer program codes; the at least one memory and the computer program codes are configured to, with the at least one processor, cause the device to perform the method of according to the first aspect.

In a third aspect, there is provided a computer readable storage medium. The computer readable storage medium comprises program instructions stored thereon, the instructions, when executed by a processor of a device, causing the device to perform the method according to the first aspect.

In a fourth aspect, there is provided an apparatus for communication. The apparatus comprises means for performing steps of the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
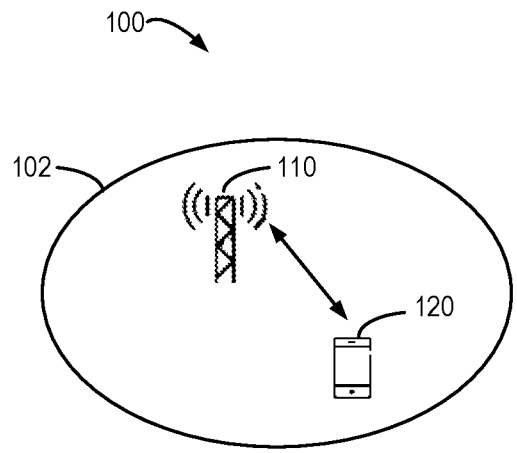
FIG. 1 illustrates a schematic diagram of an example wireless communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/ or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network node" or "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurement, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

FIG. 1 illustrates an example wireless communication network 100 in which embodiments of the present disclosure may be implemented. As shown, the communication network 100 includes one network device 110, for example, network device 110, and one terminal device (or UE) 120. It is to be understood that the number of network devices and terminal devices is only for the purpose of illustration without suggesting any limitations. The network 100 may include any suitable number of network devices and terminal devices adapted for implementing embodiments of the present disclosure.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Typically, in order to communicate data with the network device 110, the terminal device 120 may initiate the RA procedure to establish a connection with the network device 110.

There are a plurality of possible RA modes, such as, a two-step RA, a four-step RA, and etc. In some scenarios, a plurality of RA modes including one or more quick modes RA and one or more slow modes RA are supported simultaneously and available in a cell. The common understanding is that the terminal device should perform the quick mode RA first and can fall back to the slow mode RA in some occasions. One of the main problems is that the size of the message transmitted on contention-based resources in the quick RA mode may be much larger as compared to the slow RA mode, which may result in more collisions and transmission failures. Another related problem is that the network device 110 would need to reserve significant amounts of contention-based UL resources, which is not beneficial from an overhead perspective. Hence, always starting with the quick mode RA is not a good option.

In order to address at least some of the above problems and other potential problems, according to embodiments of the present disclosure, there is proposed a solution for selecting of RA mode.

In general, by obtaining an impact factor before selecting the RA mode, the terminal device 120 may select and perform the RA mode more flexible, such that the terminal device 120 could maximize the benefit of the quick mode RA meanwhile ensure the success percentage of the RA.

Figure 2:
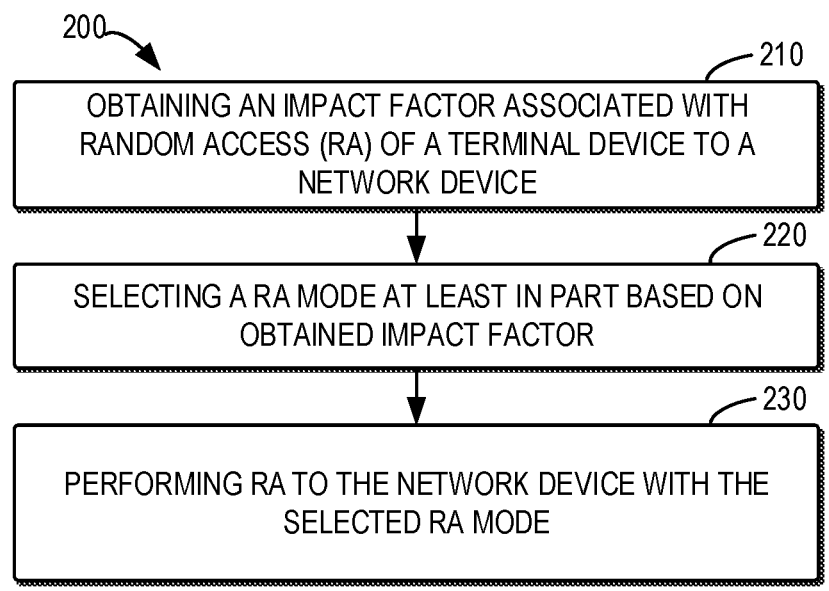
FIG. 2 illustrates a flowchart of an example method in accordance with some example embodiments of the present disclosure.

Principle and implementations of the present disclosure will be described in detail below with reference to FIG. 2, which shows a flowchart of an example method 200 in accordance with some embodiments of the present disclosure. The method 200 can be implemented at the terminal device 120 as shown in FIG. 1. For the purpose of discussion, the method 200 will be described from the perspective of the terminal device 120 with reference to FIG. 1.

At block 210, the terminal device 120 obtains the impact factor associated with RA of the terminal device 120 to the network device 110. As used herein, the phrase "impact factor" refers to the information that may influence the selecting of RA mode. Examples of the impact factor include, but are not limited to, a synchronization status between the terminal device 120 and the network device 110, a status of a channel between the terminal device 120 and the network device 110 for performing RA, a capability of the terminal device 120 for supporting early data transmission (EDT), a predefined access category of the terminal device 120, a RA mode-related indication received from the network device 110, or any combination thereof.

At block 220, the terminal device 120 selects the RA mode at least in part based on the impact factor obtained at block 210. That is, according to embodiments of the present disclosure, the RA mode to be used by the terminal device 120 may be flexibly selected or determined based on the specific scenario and/or situation. By performing RA to the network device 110 with the selected RA mode at block 230, the terminal device 120 could perform the quick mode RA at appropriate occasions/circumstances/situation, such that benefit of the quick mode RA could be maximized and drawbacks minimized Now some example embodiments will be discussed below.

As mentioned above, in some embodiments, the impact factor may indicate the synchronization status between the terminal device 120 and the network device 110. The synchronization status may be obtained based on external clock and information on the network timing. In some embodiments, the Synchronization status may be obtained based on a status of timing advance timer (TAT) running on the terminal device 120. In response to a determination that the TAT running on the terminal device 120 is unexpired, the terminal device 120 determines that the terminal device 120 and the network device 110 are synchronized, and selects the quick RA mode and performs the quick RA procedure. Example of the quick mode RA includes, but is not limited to the two-step RA. During the two-step RA procedure, preamble and physical uplink shared channel (PUSCH) transmission are combined for uplink transmission, and RA response and contention resolution message are combined for downlink transmission. So, the two-step RA procedure may be completed more rapidly for only including two messages.

In response to the determination that the terminal device 120 and the network device 110 are unsynchronized, the terminal device 120 selects the slow RA mode and performs the slow RA procedure. Example of the slow mode RA includes, but is not limited to the four-step RA. During the four-step RA procedure, four messages including preamble, RA response, Msg 3 on PUSCH and contention resolution message, may be exchanged between the terminal device 120 and the network device 110.

In such embodiments, by performs the quick RA mode under synchronized status, the data to be sent with the preamble may be transmitted more reliably and earlier.

Alternatively, or in addition, in some embodiments, the impact factor may indicate the status of the channel between the terminal device 120 and the network device 110 for performing RA. In such embodiments, the terminal device 120 may monitor the radio channel or even the specific RA resources to obtain the status of the channel. In some embodiments, the terminal device 120 may monitor a received power level on the channel. In some embodiments, the terminal device 120 calculates the power level as an average power level observed on a certain set of resources for a given observation period. Alternatively, the terminal device 120 calculates the power level as a percentage of time within a given observation period where the instantaneous power level is above a predefined value.

In some embodiments, the terminal device 120 may be configured with a threshold for estimating the radio channel. In some embodiments, the power threshold may be determined based on a received signal strength indication (RSSI). Alternatively, or in addition, the power threshold may be determined based on channel occupancy (CO). In some embodiments, the power threshold may be configured by the network device 110 through a UE-specific signaling or a cell-specific signaling.

The terminal device 120 determines that the radio channel is busy in response to the power level being above the power threshold, and selects and performs the slow mode RA. The terminal device 120 determines that the radio channel is idle in response to the power level being below the power threshold, and selects and performs the quick mode RA.

In such embodiments, as the status of the channel is an important influence factor to the success rate of RA procedure, the terminal device 120 estimating the status of the channel beforehand may benefit the selecting of the RA mode.

For small cells, as the terminal device 120 may be in closer vicinity to other UEs, the terminal device 120 can better estimate the uplink load based on local measurements. For unlicensed operation, nodes within the coverage area are in general able to detect presence of each other. Thus, such embodiment may benefit the scenarios of unlicensed operation and small cell more.

Alternatively, or in addition, in some embodiments, the impact factor may indicate the capability of the terminal device 120 for supporting EDT. The terminal device 120 may determine if this device is capable of supporting EDT. In response to a determination that the terminal device 120 supports the EDT, the terminal device 120 selects and performs the quick RA mode, else, selects and performs the slow RA mode. The terminal device 120 may receive a configuration indication from the network device 110 indicating that the terminal device 120 may use the quick mode RA if the terminal device 120 supports EDT.

In such embodiments, the terminal device 120 could transmit data without entering into a connected mode such that the data could be transmitted earlier than with the slow RA mode.

Alternatively, or in addition, in some embodiments, the impact factor may indicate the predefined access category of the terminal device 120. In some embodiments, the terminal device 120 obtains the impact factor by receiving from the network device 110 configuration information indicating that the predefined access category is associated with the RA mode. If the terminal device 120 belongs to the predefined access category, based on the configuration information, the terminal device 120 may select and perform the quick mode RA; otherwise, the terminal device 120 may select and perform the slow mode RA.

In some embodiments, the predefined access category could be obtained without receiving the configuration information from the network device 110. In this scenario, particularly for NR, access category and corresponding access category identity are stored in the subscriber identity module (SIM) or universal subscriber identity module of the terminal device 120. The terminal device 120 with the predefined access category could initiate a quick mode RA always.

In some embodiments, the predefined access category may be defined as including one or more access classes of the terminal device 120.

In such embodiments, as the predefined access category are used for access control to limit the number of UEs. The network device 110 could manage the RA procedure more flexible.

Alternatively, or in addition, in some embodiments, the impact factor may indicate a RA mode-related indication received from the network device 110. In some embodiments, the RA mode-related is an explicit indication for indicating whether or not to use the quick mode RA. In the scenario of network-initiated RA, the network device 110 transmits the RA mode-related indication within a physical downlink control channel (PDCCH) order or a Handover command. While, in the scenario of UE-initiated RA, the network device 110 transmits the RA mode-related indication within at least one of a UE-specific signaling, a cell-specific signaling acquired by the terminal device prior to a UE-initiated RA procedure and other broadcast signals transmitted on a control channel. In some embodiments, the UE-specific signaling is a Radio Resource Control (RRC) signaling, and the cell-specific signaling is a System Information Block (SIB) signaling. One illustrative example is: the network device 110 signals the terminal device 120 that the terminal device 120 cannot use the quick mode RA resources by using SIB signal while a specific sub-set of the UEs is informed using RRC signaling that they can use two-step resources. In this case, RRC configuration would "overwrite" the SIB configuration. In such embodiments, the network device 110 could control the RA procedure of the terminal device 120 dynamically.

In some embodiments, the terminal device 120 may also select the RA mode based on a size of data to be sent in the RA. One illustrative example is: the terminal device 120 determines whether the payload on PUSCH is smaller than a threshold. In some embodiments, the size of data is a size of a packet in the service data adaption protocol/packet data convergence protocol (PDCP/SDAP). The threshold may be configured or implicitly determined by the terminal device 120 based on a predetermined size of data that is allowed to be sent in the quick mode RA. In an example, the size of the data may be predetermined as the amount of data that can be sent together with an uplink (UL) message of the quick mode RA. In such case, the terminal device 120 determines whether the SDAP service data unit (SDU) can be fully multiplexed into one of the UL messages of the quick mode RA. In some embodiments, the size of data also comprising an addition layer two (L2) headers. In response to a determination that the size of data is below a threshold, the terminal device 120 selects the quick RA mode and performs the quick RA mode.

In some embodiments, an apparatus capable of performing any of the method 200 (for example, the terminal device 120) may comprise means for performing the respective steps of the method 200. The means may be implemented in any suitable form. For example, the means may be implemented in a circuitry or software module.

In some embodiments, the apparatus comprises: means for obtaining an impact factor associated with RA of a terminal device 120 to a network device 110, the impact factor indicating at least one of the following: a synchronization status between the terminal device 120 and the network device 110, a status of a channel between the terminal device 120 and the network device 110 for performing RA, a capability of the terminal device 120 for supporting early data transmission (EDT), a predefined access category of the terminal device 120, or a RA mode-related indication received from the network device; means for selecting a RA mode at least in part based on obtained impact factor; and means for performing RA to the network device with the selected RA mode.

In some embodiments, the means for obtaining the impact factor may comprise: means for in response to a determination that a timing advance timer (TAT) running on the terminal device 120 is unexpired, determining that the terminal device 120 and the network device is synchronized; and means for selecting the RA mode may comprises means for in response to the determination that the terminal device 120 and the network device is synchronized, selecting a quick RA mode.

In some embodiments, the means for obtaining the impact factor may comprise: means for determining the status of the channel by: monitoring a power level of the channel; and in response to a determination that the power level is below a power threshold, determining that the radio channel is idle.

In some embodiments, the means for selecting the RA mode may comprise: means for in response to the determination that the channel is idle, selecting a quick RA mode.

In some embodiments, the power threshold is determined based on at least one of the following: a received signal strength indication (RSSI) and channel occupancy (CO).

In some embodiments, the means for selecting the RA mode may comprises: means for in response to a determination that the terminal device 120 supports the EDT, selecting a quick RA mode.

In some embodiments, the means for obtaining the impact factor comprising: means for receiving from the network device configuration information indicating that the predefined access category is associated with the RA mode.

In some embodiments, the RA mode-related indication is received from the network device in a PDCCH order or a Handover command.

In some embodiments, the RA mode-related indication is received from the network device in at least one of a UE-specific signaling and a cell-specific signaling.

In some embodiments, the UE-specific signaling is a Radio Resource Control (RRC) signaling, and the cell-specific signaling is a System Information Block (SIB) signaling.

In some embodiments, the impact factor further comprises a size of data to be sent in the RA, and the means for selecting the RA mode may comprises: means for in response to a determination that the size of data to be sent together with a preamble for RA is below a threshold, selecting a quick RA mode.

In some embodiments, the threshold is determined based on a predetermined size of data that is allowed to be sent in the quick RA mode.

In some embodiments, the size of data is a size of a packet in the SDAP/PDCP buffer.

In some embodiments, the quick RA mode is a two-step RA.

In some embodiments, the means comprises at least one processor; and at least one memory including computer program code, the at least one memory and computer program code configured to, with the at least one processor, cause the performance of the apparatus.

Figure 3:
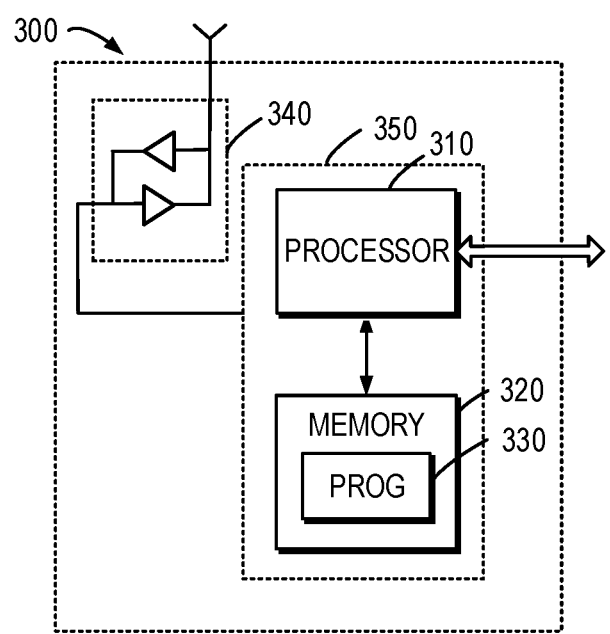
FIG. 3 illustrates a simplified block diagram of a device that is suitable for implementing example embodiments of the present disclosure.

FIG. 3 illustrates a simplified block diagram of an apparatus 300 that may be embodied as or comprised in a terminal device or a network device, for example, a terminal device 120 or a network device 110 shown in FIG. 1.

The apparatus 300 comprises at least one processor 310, such as a data processor (DP) and at least one memory (MEM) 320 coupled to the processor 310. The apparatus 300 may further include a transmitter TX and receiver RX 340 coupled to the processor 310, which may be operable to communicatively connect to other apparatuses. The MEM 320 stores a program or computer program code 330. The at least one memory 320 and the computer program code 330 are configured to, with the at least one processor 310, cause the apparatus 300 at least to perform in accordance with embodiments of the present disclosure, for example the method 200.

A combination of the at least one processor 310 and the at least one MEM 320 may form processing means 350 configured to implement various embodiments of the present disclosure.

Various embodiments of the present disclosure may be implemented by computer program executable by the processor 310, software, firmware, hardware or in a combination thereof.

The MEM 320 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 310 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions are made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram code 330 in FIG. 3). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A method for communication, comprising:
    obtaining information that influences selecting a random access (RA) mode between a plurality of RA modes of a terminal device, the information indicating at least one of the following:
        a status of a channel between the terminal device and a network device for performing RA,
        a capability of the terminal device for performing random access, or
        a predefined access category of the terminal device;
    selecting a RA mode between the plurality of RA modes at least in part based on the obtained information; and
    performing RA to the network device with the selected RA mode, wherein obtaining the information indicating the status of the channel comprises:
        monitoring a power level of the channel, and wherein the method further comprises in response to a determination that the power level is below a power threshold, determining that the channel is idle, and selecting a quick random access mode, or in response to a determination that the power level is above a power threshold, determining that the channel is busy, and selecting a slow random access mode.

2. The method of claim 1, wherein the information comprises, in response to a determination that a timing advance timer (TAT) running on the terminal device is unexpired, determining that the terminal device and the network device is synchronized,
    and wherein selecting the RA mode comprises, in response to the determination that the terminal device and the network device is synchronized, selecting a quick RA mode.

3. The method of claim 1, wherein selecting the RA mode comprises:
    in response to a determination that the terminal device supports the EDT, selecting a quick RA mode.

4. The method of claim 1, wherein, the RA mode-related indication is received from the network device in a PDCCH order or a Handover command.

5. The method of claim 1, wherein, the RA mode-related indication is received from the network device in at least one of a UE-specific signaling and a cell-specific signaling.

6. The method of claim 5, wherein the UE-specific signaling is a Radio Resource Control (RRC) signaling, and the cell-specific signaling is a System Information Block (SIB) signaling.

7. The method of claim 1, wherein the information further comprises a size of data to be sent in the RA, and wherein selecting the RA mode comprises:
 in response to a determination that the size of data is below a threshold, selecting a quick RA mode.

8. The method of claim 7, wherein the threshold is determined based on a predetermined size of data that is allowed to be sent in the quick RA mode.

9. The method of claim 7, wherein the size of data is a size of a packet in the SDAP/PDCP buffer.

10. The method of claim 2, wherein
 the quick RA mode is a two-step RA.

11. A non-transitory computer readable storage medium comprising program instructions stored thereon, the instructions, when executed by a processor of a device, causing the device to perform the method of claim 1.

12. An apparatus for communication, comprising:
 at least one processor; and
 at least one memory including computer program code;
 the at least one memory and the computer program code being configured to, with the at least one processor, cause the apparatus at least to perform
 obtaining information that influences selecting a random access (RA) mode between a plurality of RA modes of a terminal device, the information indicating at least one of the following:
  a status of a channel between the terminal device and a network device for performing RA,
  a capability of the terminal device for performing random access, or
  a predefined access category of the terminal device;
 selecting a RA mode between the plurality of RA modes at least in part based on the obtained information; and
 performing RA to the network device with the selected RA mode, wherein obtaining the information indicating the status of the channel comprises:
  monitoring a power level of the channel, and wherein the method further comprises in response to a determination that the power level is below a power threshold, determining that the channel is idle, and selecting a quick random access mode, or in response to a determination that the power level is above a power threshold, determining that the channel is busy, and selecting a slow random access mode.

13. The apparatus of claim 12, wherein the information comprises, in response to a determination that a timing advance timer (TAT) running on the terminal device is unexpired, determining that the terminal device and the network device is synchronized,
 and wherein selecting the RA mode comprises, in response to the determination that the terminal device and the network device is synchronized, selecting a quick RA mode.

14. The apparatus of claim 12, wherein selecting the RA mode comprises:
 in response to a determination that the terminal device supports the EDT, selecting a quick RA mode.

15. The apparatus of claim 12, wherein,
 the RA mode-related indication is received from the network device in a PDCCH order or a Handover command.

16. The apparatus of claim 12, wherein,
 the RA mode-related indication is received from the network device in at least one of a UE-specific signaling and a cell-specific signaling.

17. The apparatus of claim 16, wherein the UE-specific signaling is a Radio Resource Control (RRC) signaling, and the cell-specific signaling is a System Information Block (SIB) signaling.

18. The apparatus of claim 12, wherein the information further comprises a size of data to be sent in the RA, and wherein selecting the RA mode comprises:
 in response to a determination that the size of data is below a threshold, selecting a quick RA mode.

19. The apparatus of claim 18, wherein the threshold is determined based on a predetermined size of data that is allowed to be sent in the quick RA mode.

20. The apparatus of claim 18, wherein the size of data is a size of a packet in the SDAP/PDCP buffer.

21. The apparatus of claim 13, wherein
 the quick RA mode is a two-step RA.

\* \* \* \* \*